United States Patent [19]
Wicke

[11] 3,771,540
[45] Nov. 13, 1973

[54] SAFETY DEVICE FOR GATE VALVE ACTUATOR

[75] Inventor: Charles H. Wicke, Richmond, Tex.

[73] Assignee: ACF Industries, Incorporated, New York, N.Y.

[22] Filed: Nov. 19, 1971

[21] Appl. No.: 200,303

[52] U.S. Cl. .................................. 137/75, 251/284
[51] Int. Cl. ............................................ F16k 17/38
[58] Field of Search ............................. 137/72–77; 220/89 B; 122/504.1, 504.3; 169/1 B, 19, 37, 41

[56] References Cited
UNITED STATES PATENTS

| | | | |
|---|---|---|---|
| 1,639,814 | 8/1927 | Shrum et al. | 138/96 T |
| 1,771,716 | 7/1930 | Lovekin | 137/77 |
| 2,655,166 | 10/1953 | Steins et al. | 137/72 |
| 3,659,624 | 5/1972 | Kelly et al. | 137/72 |
| 973,260 | 10/1910 | Creighton | 137/75 |
| 1,511,978 | 10/1924 | Muhlebach | 122/504.3 |

Primary Examiner—Henry T. Klinksiek
Assistant Examiner—Richard Gerard
Attorney—Eugene N. Riddle

[57] ABSTRACT

The end wall of a cylinder actuator for a gate valve has a threaded extension thereon with a central bore through which a gate valve stem extends. An internally threaded cap having an end opening in alignment with the valve stem is fitted on the extension and houses a separate plug in abutting relation to the gate valve stem to restrain movement of the valve stem when the gate is in an open position. The plug is retained within the cap by a destructible sleeve fitting about the plug which is adapted to fail at a predetermined temperature, such as around 300°F., whereby the valve stem under bias pushes the plug outwardly through the cap opening upon failure of the destructible sleeve to permit closing of the gate at a predetermined high temperature.

4 Claims, 7 Drawing Figures

Patented Nov. 13, 1973

INVENTOR.
CHARLES H. WICKE
BY Eugene N. Riddle
ATTORNEY

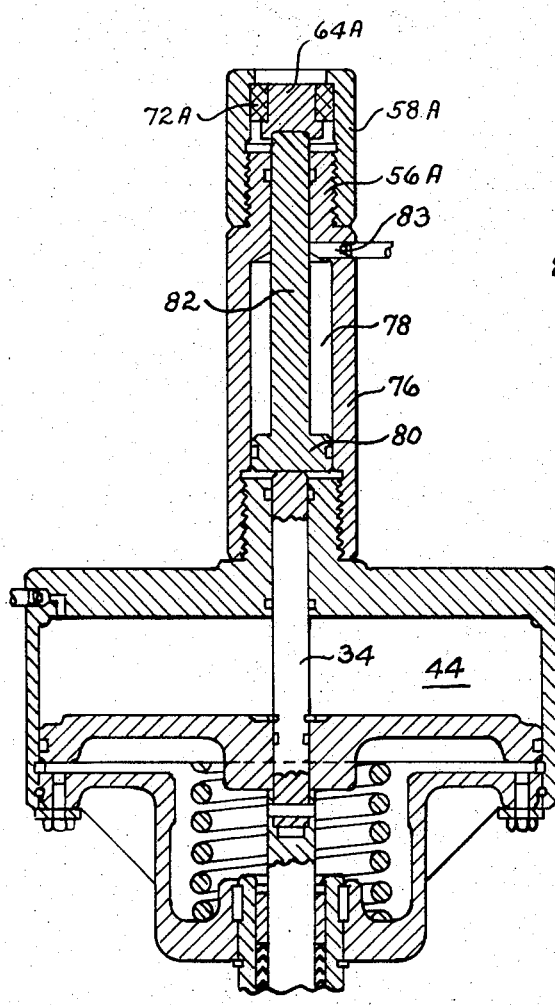
FIG. 5.
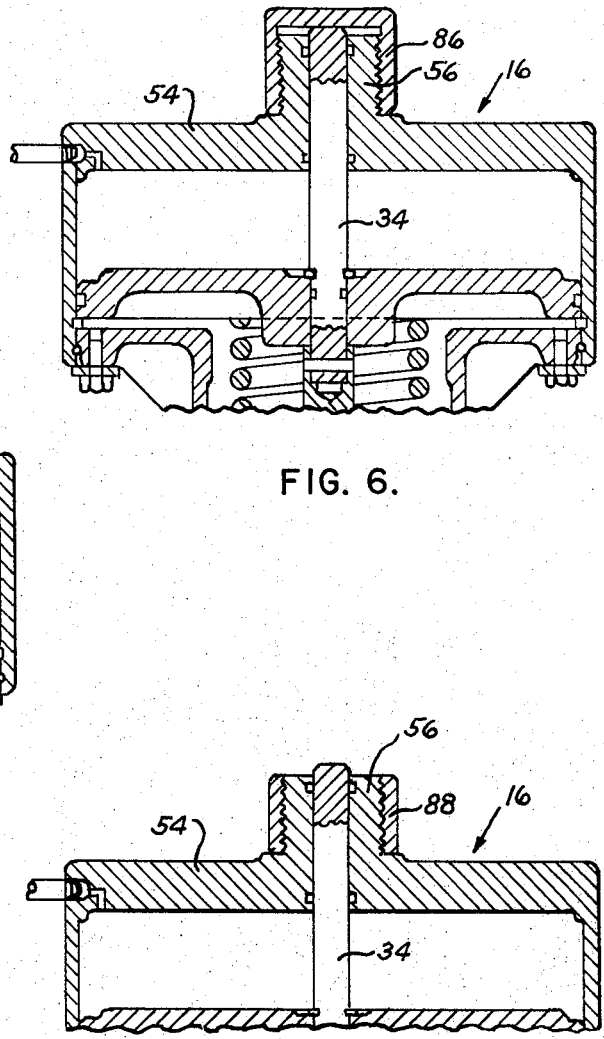
FIG. 6.
FIG. 7.

SAFETY DEVICE FOR GATE VALVE ACTUATOR

BACKGROUND OF THE INVENTION

Heretofore, various types of safety devices have been provided with valve mechanisms to effect actuation of the valve at some predetermined temperature. Fusible materials which might melt or fail at predetermined high temperatures have been provided and upon the temperatures reaching a predetermined high, the fusible materials have deteriorated or been deformed to permit the movement of an associated valve. For example, U. S. Pat. No. 705,572 dated July 29, 1902 discloses a valve having a valve stem extending therefrom in abutting relation to a disk formed of a fusible material. Upon failure of the fusible material comprising the disk at a predetermined high temperature, the valve stem is urged upwardly to permit closure of the valve. Thus, it is well known generally to employ a fusible material which fails at a high temperature to permit actuation of a valve.

DESCRIPTION OF THE PRESENT INVENTION

The present invention is particularly adapted for use in combination with a piston-type fluid actuator for a gate valve with the valve stem for the gate extending through an end wall of the cylinder housing the piston. The stem is normally urged outwardly by a spring beneath the piston and moves outwardly when the valve moves to a closed position. At times, it might be desirable to have the gate valve locked in an open position so that it remains in such open position under normal operation even though failure of the fluid system might result when the gate is in an open position. However, even under these circumstances, it is desirable that the gate move to a closed position upon the occurrence of some safety hazard, such as a fire, occurring adjacent the valve. Thus, upon the temperature from a fire or other source reaching a predetermined high, the gate valve would move to a closed position upon a failure or destruction of the safety device.

The gate valve actuator of the present invention has a cylinder end wall with an externally threaded extension thereon and a central bore extending through the end wall and extension. A piston is mounted in the cylinder and a spring continuously urges the piston to an outer position. A valve stem extends from the piston and has an outer end portion received within the central bore of the extension whereby the stem moves outwardly with the piston and gate valve when the gate moves to a closed position, and moves inwardly with the piston and gate valve upon movement of the gate to an open position. With the gate in an open position and the valve stem retracted within the extension, the present invention which is housed within an internally threaded cap may be secured in threaded engagement with the externally threaded extension. The cap has a central opening in its end wall and houses a generaly cylindrical plug in axial alignment with and in contact with the extending stem to maintain the gate normally open against the bias of the spring. A sleeve formed of a destructible material fits about the cylindrical plug and is seated between a shoulder on the plug and an inner abutting surface of the cap to retain the plug within the cap. The plug has a maximum diameter which is less than the diameter of the opening in the cap and upon failure or destruction of the sleeve at a predetermined high temperature of at least about around 200° F., the valve stem under the bias of the spring pushes the plug through the cap opening upon failure of the destructible sleeve thereby to permit closing of the gate valve at such predetermined high temperature. Thus, the cap containing the destructible sleeve therein may be selectively threaded onto the extension of the cylinder end wall. It may be desirable in some instances to have the gate mounted for movement to a closed position upon failure of the fluid system for the actuator and, if so, the safety cap may be removed.

The invention accordingly comprises the constructions hereinafter described, the scope of the invention being indicated in the following claims.

In the accompanying drawings, in which several of various possible embodiments of the invention are illustrated, FIG. 1 is a sectional view of a gate valve structure illustrating the gate and fluid actuator therefor with the safety cap comprising the present invention mounted on the fluid cylinder;

FIG. 5 is a sectional view of a modified embodiment of the present invention in which a hydraulic fluid override is mounted on the fluid actuator and the present invention comprising the safety cap structure is mounted on the extending end of the hydraulic fluid override;

FIG. 6 is an enlarged sectional view showing an arrangement in which the safety cap structure has been removed and a cap attached which prevents movement of the gate valve to a closed position; and FIG. 7 is a further view showing an arrangement in which the safety cap structure has been removed and a threaded sleeve has been attached to protect the external threads on the extension.

Figure 1:
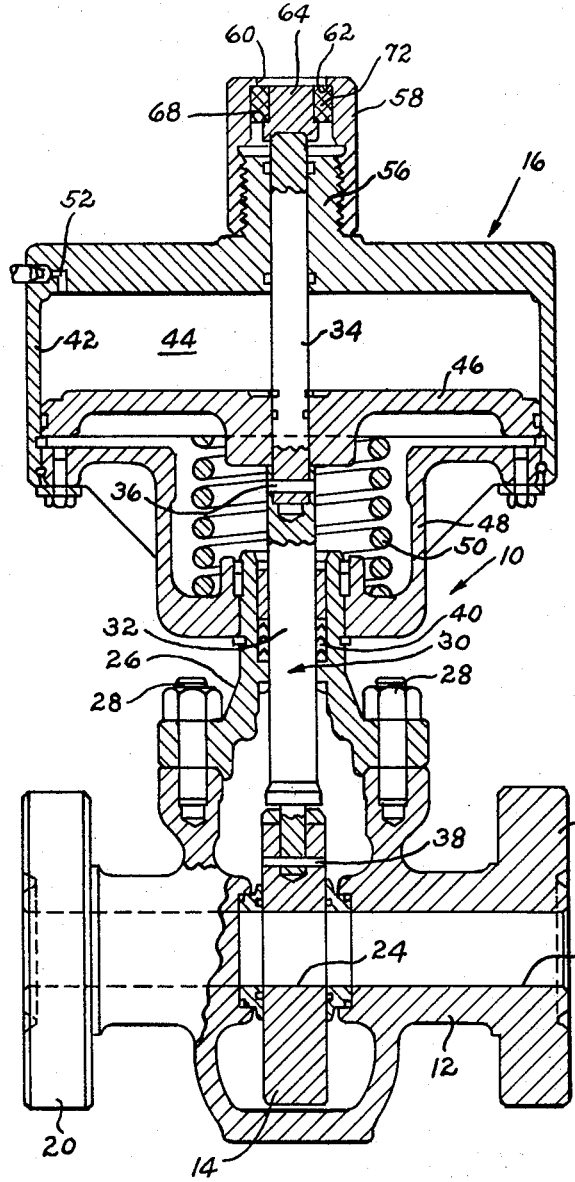

Referring to the drawings and more particularly to the embodiment shown in FIGS. 1–4, the valve structure generally indicated 10 includes a valve body 12, a gate 14, and an actuator generally indicated 16 which moves gate 14 between open and closed positions. Body 12 has flanges 18 and 20 which are adapted to be connected to a flow line (not shown) and a bore 22 extends through body 12 in alignment with a port 24 in gate 14 when gate 14 is in open position.

A bonnet 26 is bolted at 28 to valve body 12. A valve stem generally indicated 30 has a lower stem portion 32 and an upper stem portion 34 pivotally connected thereto at pivot pin 36. Lower stem portion 32 is connected to gate 14 at pivot pin 38. A stem packing 40 carried within bonnet 26 extends about lower stem portion 32. Actuator 16 includes a cylinder 42 having a fluid chamber 44 and a piston 46 secured to upper stem portion 34 for movement therewith. Base 48 houses a spring 50 therein which engages the inner surface of piston 46 to urge continuously piston 46 to an outward or upper position as shown in FIG. 1. A suitable source of fluid may be provided through bore 52 in the upper portion of an outer end wall 54 of cylinder 42. All of the above structure comprises conventional structure of a valve assembly having a fluid-type actuator. While actuator 16 is shown as a pneumatic actuator, it is understood that the actuator may, if desired, be of a hydraulic fluid type.

The present invention is directed particularly to a destructible closure means positioned adjacent the extending end of upper stem portion 34. An externally threaded extension 56 extends upwardly from end wall 54. A cap 58 having internal screw threads is threaded onto extension 56. Cap 58 has an upper opening 60 and an inner circumferential ledge or abutment 62 is formed adjacent opening 60. A plug 64 formed of a solid material and generally cylindrical in shape but having a lower circumferential flange or shoulder 66 is housed within cap 58. Circumferential shoulder 66 forms an abutment 68. The outer diameter of plug 64 is substantially smaller than the diameter of opening 60 thereby to permit passage of plug 64 through opening 60. An indentation 70 in the inner surface of plug 64 receives the adjacent extending end of stem portion 34 and tends to maintain plug 64 in axial alignment with stem portion 34 upon outward or longitudinal movement of upper stem portion 34.

A sleeve or ring 72 is housed within cap 58 and fits between abutments 62 and 68 to retain plug 64 within cap 58 in engagement with the adjacent end of stem portion 34. Sleeve 72 has an outer diameter generally the same as the inner diameter of cap 58 so as to fit snugly therein.

Sleeve 72 is preferably formed of a material which will fail at a predetermined high temperature. The temperature at which the material will fail may vary depending on the particular field conditions involved but is preferably around 300°F and in the range of between around 225°F and 500°F. One destructible material which has been found to be suitable is sold under the tradename "Nylatron" and manufactured by The Polymer Corporation, Reading, Pennsylvania. "Nylatron" is composed of Nylon with reinforcing additives of fiberglas and molybdenum disulfide and may be formed by an injection molding process with the composition containing 30 percent fiberglas, 5 percent molybdenum disulfide, and 65 percent Nylon. Other materials which have been found satisfactory are an acetal homopolymer and an acetal copolymer. While the material from which the sleeve 72 is formed would fuse or melt at a predetermined high temperature, the urging of stem portion 34 shears the material before such melting or fusing occurs.

Plug 64 having shoulder 66 thereon permits a relatively large shear area which is determined by the length of plug 64 and the outer diameter of shoulder 66. A relatively large shear area is desirable in order to provide a suitable cross section of the destructible material. Thus, the use of plug 64 permits the shear area to be increased as compared with a solid cylindrical destructible material which abuts the end of the valve stem. A wider range of materials may be utilized to comprise the destructible member.

Figure 4:
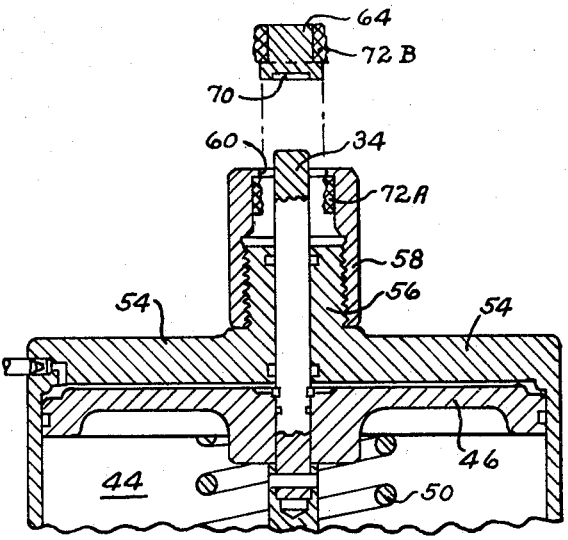
FIG. 4 is a section of the upper portion of the fluid actuator illustrating the safety cap after failure of the destructible sleeve and movement of the valve stem to the closed position of the gate.
Figure 3:
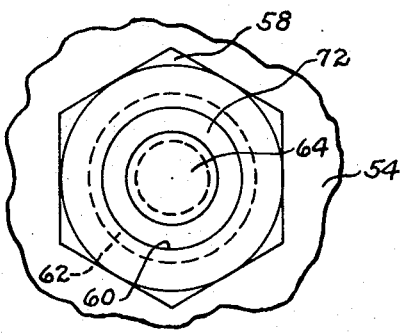
FIG. 3 is a top plan of the safety cap structure illustrated in FIG. 2.
Figure 2:
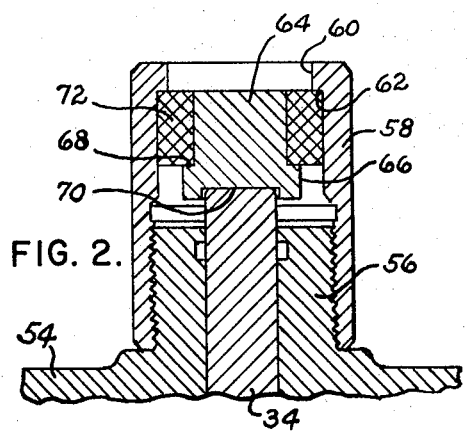
FIG. 2 is an enlarged sectional view of a fragment of FIG. 1 showing the safety cap comprising the present invention in abutting relation with the extending end of the valve stem and retaining the gate in an open position.

Upon the predetermined temperature being reached, upper stem portion 34 under bias of spring 50 urges plug 64 outwardly and sleeve 72 shears leaving a portion 72A thereof within cap 58 while a central portion 72B is pushed outwardly by plug 64 as shown in FIG. 4, thereby to close gate 14. Thus, when valve structure 10 is exposed to a fire or the like with gate 14 in an open position, the high temperature resulting from the fire will effect closing of gate 14.

Referring to FIG. 5, the present invention is shown in combination with a hydraulic fluid override which might be employed to move gate 14 to an open position upon a failure of the primary source of fluid in fluid chamber 44. At times it is desirable to reopen a gate after failure occurs and the gate has moved to a safe closed position. The hydraulic fluid override will accomplish opening of the gate and includes an auxiliary fluid cylinder 76 having a fluid chamber 78. A piston 80 is mounted within fluid chamber 78 and piston rod 82 extends outwardly in engagement with plug 64A. Hydraulic fluid may be provided to chamber 78 through port 83. Cap 58A is threaded onto an extension 56A on fluid cylinder 76 and a sleeve 72A of a destructible material which fails at a high temperature is provided in cap 58A. Cap 58A, plug 64A, and sleeve 72A are identical to the corresponding structure shown in the embodiment of FIGS. 1–4.

FIGS. 6 and 7 show attachments which may be selectively employed when the safety device comprising the present invention is removed from threaded extension 56. FIG. 6 illustrates a positive lock to hold the gate in an open position and comprises a cap 86 which is threaded onto extension 56 and abuts the end of upper valve stem portion 34 to lock gate 14 in an open position until cap 86 is removed.

FIG. 7 simply shows a protector ring 88 which might be threaded onto the external screw threads of extension 56 to prevent damage thereto when the safety device comprising the present invention has been removed. The gate is free to move between open and closed positions under the control of actuator 16 in the arrangement shown in FIG. 7.

What is claimed is:

1. In combination with a gate valve actuator having a cylinder, a cylinder end wall with an externally threaded extension thereon and a central bore extending through said end wall and extension, a piston mounted within the cylinder for longitudinal movement and forming an expansible chamber therewith, means continuously urging the piston to an outer position, and a valve stem extending from the piston and having an outer end portion received within the bore, the stem being operatively connected to a gate for outward movement with the piston and gate to a closed position and inward movement with the piston and gate to an open position; the improvement comprising destructible closure means on said extension, said destructible closure means comprising, an internally threaded cap in threaded engagement with the externally threaded extension and having a central opening therein, a plug within the cap in axial alignment with and in contact with the extending stem end for maintaining the gate normally open against the urging means and having a lateral extension, a sleeve formed of a destructible material fitting about the plug and seated between the lateral extension on the plug and the inner surface of the cap adjacent said opening thereby to retain the plug within the cap, said plug being of a maximum diameter substantially less than the diameter of said opening and said sleeve having an outer diameter substantially greater than the diameter of said opening, said plug having a depression therein adjacent the extending end of the stem and receiving said end therein, said sleeve being formed of a material which shears under bias upon reaching a predetermined high temperature whereby the valve stem under the bias of the urging means pushes the plug through the cap opening upon failure of the destructible sleeve thereby to permit closing of the gate at a predetermined high temperature.

2. The combination set forth in claim 1 wherein the lateral extension on said plug comprises a shoulder fitting against said destructible sleeve and shearing said sleeve along a line generally in alignment with the outer extension of said shoulder.

3. A gate valve structure comprising, a valve body having a flow passage extending therethrough, a gate having a port in its upper end adapted to be aligned with the flow passage in its inner open position and to close the flow passage in an outer closed position, a stem assembly secured at one end to said gate for moving said gate between open and closed positions, a cylinder housing having an end wall with an externally threaded extension thereon and a central bore extending through the end wall and extension, a piston secured to the stem assembly within said cylinder housing whereby fluid pressure applied in said cylinder housing against said piston displaces said piston and stem assembly inwardly to the open position of the gate, a resilient member between said piston and cylinder housing for biasing said piston and the stem assembly outwardly to the closed position of the gate; an internally threaded cap in threaded engagement with the externally threaded extension, said cap having a central opening therein and an inner circumferential abutment adjacent the opening, a plug within the cap in axial alignment with and in contact with the extending stem end for maintaining the gate normally open against the bias of the resilient member and having a lateral extension, said circumferential abutment and lateral extension defining lateral extending shoulders spaced from each other along the longitudinal axis of said stem, a generally cylindrical sleeve formed of a destructible material fitting about the plug and seated between the lateral extension on the plug and the inner circumferential abutment of the cap adjacent said opening thereby to retain the plug within the cap, said plug being of a maximum diameter substantially less than the diameter of said opening and said sleeve having an outer diameter substantially greater than the diameter of said opening, said sleeve adapted to shear upon reaching a predetermined high temperature at least above around 225° F. whereby the valve stem under the bias of the resilient member urges the plug against the sleeve to shear the sleeve and push the plug through the cap opening upon shearing of the sleeve thereby to permit closing of the gate at a predetermined high temperature.

4. A destructible closure means for a gate valve stem having its extending end received within a central bore through a cylinder end wall and an externally threaded extension on the end wall, the valve stem connected to a gate and normally urged outwardly by resilient means; said destructible closure means comprising, an internally threaded cap in threaded engagement with the externally threaded extension, said cap having a central opening therein and an inner circumferential abutment adjacent the opening, a generally cylindrical plug within the cap in axial alignment with and in contact with the extending stem end for maintaining the gate normally open and having a circumferential shoulder about its inner end spaced from said circumferential abutment along the longitudinal axis of said stem, a generally cylindrical sleeve formed of a destructible material fitting about the plug and seated between the circumferential shoulder and the circumferential abutment of the cap adjacent said opening, said plug being of a maximum diameter substantially less than the diameter of said opening, said sleeve adapted to fail in shear upon reaching a predetermined high temperature at least above around 225° F. whereby the valve stem under bias of the resilient means urges the plug outwardly through the cap opening upon shearing of the destructible sleeve thereby to permit closing of the gate at a predetermined high temperature.

* * * * *